(12) United States Patent
Sri-Jayantha et al.

(10) Patent No.: US 7,248,467 B2
(45) Date of Patent: Jul. 24, 2007

(54) APPARATUS FOR A SHOCK ABSORBER THAT ALLOWS A DISK DRIVE TO MOVE WITH RESPECT TO THE CHASSIS OF A COMPUTER SYSTEM

(75) Inventors: Sri M. Sri-Jayantha, Ossining, NY (US); Vijayeshwar D. Khanna, Millwood, NY (US); Gerard McVicker, Stormville, NY (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 285 days.

(21) Appl. No.: 10/982,452

(22) Filed: Nov. 5, 2004

(65) Prior Publication Data

US 2006/0098404 A1     May 11, 2006

(51) Int. Cl.
*G06F 1/16*     (2006.01)
(52) U.S. Cl. ..................................... 361/685
(58) Field of Classification Search ................. 361/685
See application file for complete search history.

(56) References Cited

U.S. PATENT DOCUMENTS

| | | | |
|---|---|---|---|
| 4,150,406 A | 4/1979 | Stollorz | |
| 4,367,503 A | 1/1983 | Treseder | |
| 4,683,520 A | 7/1987 | Grassens et al. | |
| 5,004,207 A | 4/1991 | Ishikawa et al. | |
| 5,366,200 A | 11/1994 | Scura | |
| 5,469,311 A | 11/1995 | Nishida et al. | |
| 5,535,092 A | 7/1996 | Bang | |
| 5,654,875 A * | 8/1997 | Lawson | 361/685 |
| 5,721,457 A * | 2/1998 | Sri-Jayantha et al. | 307/119 |
| 6,075,695 A | 6/2000 | Konno et al. | |
| 6,122,139 A | 9/2000 | Sri-Jayantha et al. | |
| 6,297,928 B1 | 10/2001 | Hahn et al. | |
| 6,477,042 B1 * | 11/2002 | Allgeyer et al. | 361/685 |
| 6,583,949 B2 | 6/2003 | Maiers | |
| 6,704,161 B1 | 3/2004 | Pham et al. | |

FOREIGN PATENT DOCUMENTS

| | | |
|---|---|---|
| JP | 3093087 | 4/1991 |
| JP | 104079 | 5/1991 |
| JP | 5028736 | 2/1993 |
| JP | 6096566 | 4/1994 |
| JP | 200016394 | 6/2000 |

OTHER PUBLICATIONS

Masaya Suwa & Keiji Aruga. "Evaluation System for Residual Vibration from HDD Mounting Mechanism" IEE Transactions on Magnets vol. 35, No. 2, Mar. 1999. San Jose, CA, USA.
Author n/a. "Rotational Vibration Suppressor" IBM Technical Disclosure Bulletin Oct. 1991. Order/Fcode/Docket: 91A62786// RO8900441 PubNo.=330.

* cited by examiner

*Primary Examiner*—Yean-Hsi Chang (57) ABSTRACT

Embodiments of the present invention pertain to an apparatus for a shock absorber that allows a disk drive to move with respect to the chassis of a computer system. In one embodiment, the disk drive shock absorber includes an assembly joint and a flexure. The flexure is capable of being coupled to the assembly joint. The assembly joint is capable of being coupled to the flexure and the computer system's chassis. The shock absorber is created by coupling the flexure to the assembly joint. The shock absorber has a form that can be used to flexibly couple the disk drive's enclosure with the computer system's chassis without requiring an increase in size of the chassis.

18 Claims, 8 Drawing Sheets

FIG. 2C SIDE VIEW

FIG. 2D BOTTOM UP VIEW

SIDE VIEW

TOP VIEW

FIG. 5 where $E$ = Young's modulus
$I$ = moment of area
$l$ = length of beam
$b$ = width of beam
$h$ = thickness of beam the stiffness $$K = \frac{3EI}{l^3}$$

for bending along the Z-axis $$I_1 = \frac{bh^3}{12}$$

for bending within the XY plane $$I_2 = \frac{b^3 h}{12}$$

thus the ratio of stiffness $$\frac{K_1}{K_2} = \left(\frac{h}{b}\right)^2$$

APPARATUS FOR A SHOCK ABSORBER THAT ALLOWS A DISK DRIVE TO MOVE WITH RESPECT TO THE CHASSIS OF A COMPUTER SYSTEM

RELATED APPLICATIONS

This Application is related to U.S. patent application Ser. No. 5,721,457 by Muthuthamby Sri-Jayantha, Vijayeshwar Khanna, Arun Sharma, Koji Kawabata, Jagdeep Tahliani, filed on Apr. 28, 1995 and entitled "Shock Isolation System with Write Inhibition," assigned to the assignee of the present invention and incorporated herein by reference as background material.

This Application is related to U.S. patent application Ser. No. 6,122,139 by Muthuthamby Sri-Jayantha, Arun Sharma, Hien Phu Dang, Vijayeshwar Khanna, Gerard McVicker, Kiyoshi Satoh, Yuzo Nakagawa, Naoyuki Kagami, filed on Jul. 20, 1998 and entitled "Disk Drive Rotary Actuator System Including Synchronous Counter Torque Generator," assigned to the assignee of the present invention and incorporated herein by reference as background material.

This application is related to U.S. patent application Ser. No. 10/981,844 by Sri-Jayantha, Sri M., Gerard McVicker, and Vijayeshwar D. Khanna filed on the same day herewith and entitled "A Method for a Shock Absorber that Allows a Disk Drive to Move with Respect to the Chassis of a Computer System," assigned to the assignee of the present invention, the contents of which are incorporated herein.

TECHNICAL FIELD

Embodiments of the present invention relates to disk drives. More specifically, embodiments of the present invention relate to allowing a disk drive to move with respect to the chassis of a computer system.

BACKGROUND ART

Figures 1A, 1B:
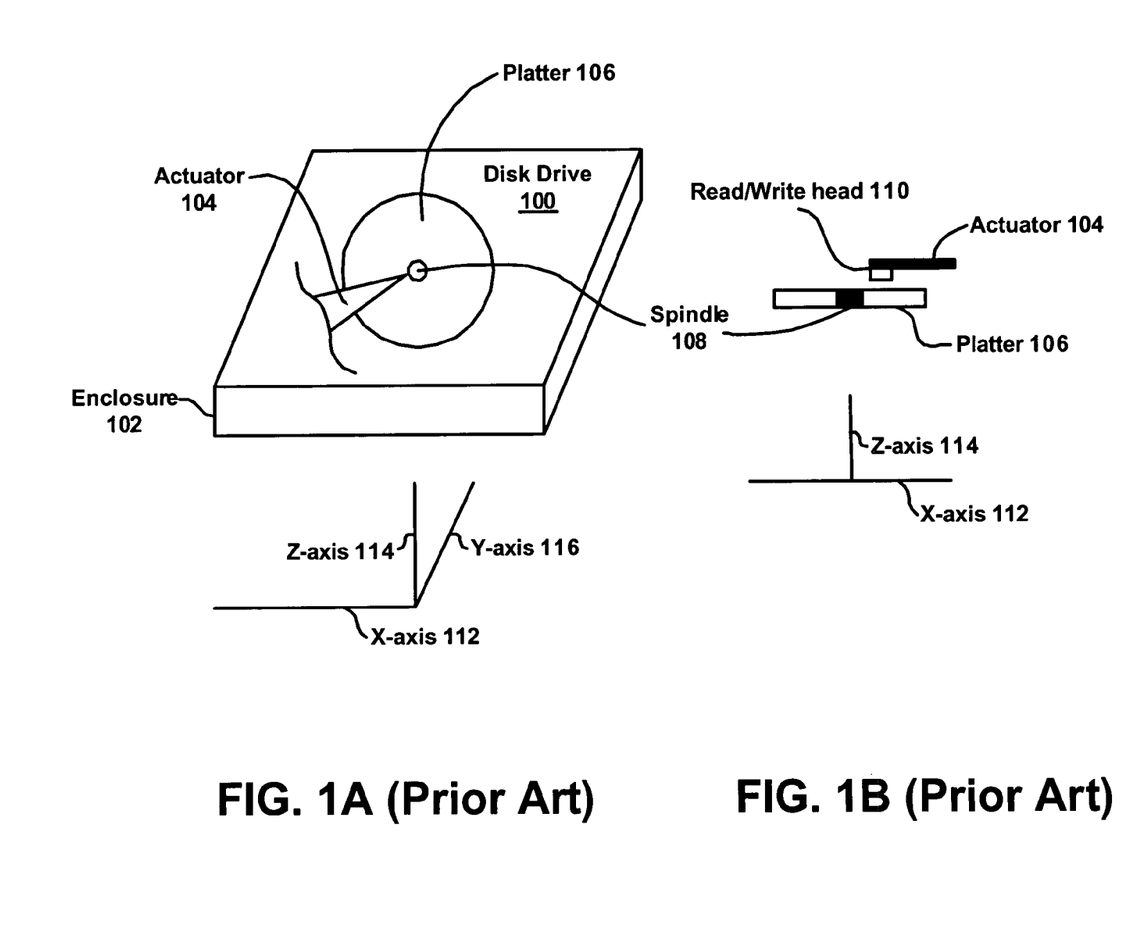
FIG. 1A depicts a 3 dimensional perspective illustration of a disk drive.
FIG. 1B depicts a 2 dimensional perspective illustration of a disk drive

Typically, disk drives are used in computer systems to read data from and write data to. FIG. 1A depicts a 3 dimensional perspective illustration of a disk drive 100 and FIG. 1B depicts a 2 dimensional perspective illustration of the same disk drive 100. A disk drive 100 is frequently enclosed in a disk drive enclosure 102 and includes one or more platters 106, an actuator 104, and a read/write head 110 that is attached to the actuator 104. The platter 106 rotates around a spindle 108 while the actuator 104 is used to position the read/write head 110 on the desired location for reading data from or writing data to the platter 106. Once the actuator 104 has positioned the read/write head 110 on the correct position, the read/write head 110 reads or writes the data to the platter 106.

Disk drives 100 that are used in mobile computer systems, such as laptops and personal digital assistants (PDAs), have to be designed to withstand shocks resulting from being dropped or moved quickly from side to side. FIG. 1A depicts a 3 dimensional perspective illustration of a disk drive 100 where the 3 dimensions are represented by the x-axis 112, y-axis 116, and z-axis 114. FIG. 1B depicts a 2 dimensional perspective illustration of the same disk drive 100 where the 2 dimensions are presented by the x-axis 112 and the z-axis 114. The z-axis 114 is perpendicular to the spindle. The x-axis 112 is depicted as running along the longest side of the disk drive 100 while the y-axis 116 is depicted as running along the shortest side of the disk drive 100. Moving a mobile computer system quickly in an up and down motion, from being dropped for example, would result in the disk drive 100 being subjected to a shock along the z-axis 114. In this case, there is a potential for the read/write head 110 coming into contact with the platter 106 resulting in loss of data and/or permanent damage to the surface of the platter 106.

These shocks can occur while the mobile computer system is in use (e.g., operational mode) or not in use (e.g., non-operational mode). The ability of such disk drives 100 to withstand such shocks has significantly improved over the last ten years when in non-operational mode. For example, the specification for withstanding shock during non-operational mode has improved from approximately 150 gravitational acceleration (e.g., 150 g) in the early 1990s to the range of approximately 750 g or higher. The ability of disk drives to withstand shocks during operational mode has not seen similar improves. The specifications for withstanding shock during operational-mode has typically lagged behind the specifications for withstanding shock during non-operational mode by about a factor of four where today's disk drives can only withstand shocks approximately in the range of 150 g to 200 g during operational mode.

More and more people are operating their mobile computer systems while they are moving about. For example, more and more people are spending significant amounts of time commuting to work on trains, buses, and in car pools. These people want to use their long commuting times efficiently, for example, by working on their computers. Therefore, the need for disk drives that can withstand shocks during operational mode is significantly increasing.

For these and other reasons, there is a need for an apparatus that reduces the chances of the read/write head 110 coming into contact with the disk drive 100's platter 106 during operational mode.

DISCLOSURE OF THE INVENTION

Embodiments of the present invention pertain to an apparatus for a shock absorber that allows a disk drive to move with respect to the chassis of a computer system. In one embodiment, the disk drive shock absorber includes an assembly joint and a flexure. The flexure is capable of being coupled to the assembly joint. The assembly joint is capable of being coupled to the flexure and the computer system's chassis. The shock absorber is created by coupling the flexure to the assembly joint. The shock absorber has a form that can be used to flexibly couple the disk drive's enclosure with the computer system's chassis without requiring an increase in size of the chassis.

BRIEF DESCRIPTION OF THE DRAWINGS

The accompanying drawings, which are incorporated in and form a part of this specification, illustrate embodiments of the invention and, together with the description, serve to explain the principles of the invention.

The drawings referred to in this description should not be understood as being drawn to scale except if specifically noted.

BEST MODE FOR CARRYING OUT THE INVENTION

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of the present invention, numerous specific details are set forth in order to provide a thorough understanding of the present invention. In other instances, well-known methods, procedures, components, and circuits have not been described in detail as not to unnecessarily obscure aspects of the present invention.

An Overview of an Apparatus for a Shock Absorber

If a mobile computer system is moved about vigorously resulting in a shock, the shock moves from the chassis of the computer system, to the enclosure of the disk drive, and ultimately to the internal components, such as the actuator, the read/write head, etc., of the disk drive itself. By using shock absorbers to couple a computer system's chassis to a disk drive's enclosure, the disk drive is allowed to move with respect to the chassis, thus, reducing the chances of the read/write head from colliding with the disk drive's platter. For example, if the computer system is moved vigorously, the shock is reduced as it moves from the computer system's chassis through the shock absorbers that couple the computer system's chassis to the disk drive's enclosure and ultimately to the disk drive's internal components. Thus, shock absorbers can be used to reduce the effects of shocks before the shocks reach the internal components (e.g., actuator, read/write head, etc.).

At one point in the past, shock absorbers that used a rubber mount were used. These rubber mounts allowed the disk drive's enclosure to move relative to the computer system's chassis in all directions (e.g., along the x-axis 112, y-axis 116, and the z-axis 114). However, as the demand for higher density (e.g., write more tracks-per-inch on a recording medium, such as a platter) increased, the softness about the rotational axis (e.g., z-axis 114) resulting from using the rubber mounts started limiting the seek performance of the disk drives. Due to the reaction torque from the voice coil model (VCM), resulting for example from an actuator seek, the disk drive enclosure would rotate about the rotational axis and would continue to vibrate long after the actuator had completed its seek. This vibration would impede the actuator from settling onto its destination track in a timely manner.

Therefore, the shock absorbers were eventually discarded and the industry started attaching the disk drive's enclosure rigidly to the computer system's chassis, for example, by using a mounting frame. This allowed the disk drives to have good seek performance, however, this approach also made the disk drives more vulnerable to shocks. For example, if a mobile computer system that uses a rigid mounting structure is moved about vigorously, the shock moves directly from the chassis of the computer system, to the enclosure of the disk drive, and ultimately to the internal components, such as the actuator, the read/write head, etc., of the disk drive itself.

Since the industry stopped using shock absorbers, a number of other types of approaches have been tried to reduce the chances of the read/write head from colliding with the disk drive's platter. However, to date these approaches have involved modifying the internal components of the disk drive. There is a need to provide an apparatus that reduces the effects of a shock before it reaches the internal components without unduly impacting seek performance. For this reason, the industry has attempted to design shock absorbers that do not use rubber mounts. However, these attempts have failed because they have resulted in increasing the size of the chassis of the computer system which is unacceptable for mobile computer systems.

Therefore, there is a need for a shock absorber that can reduce the effects of shock before the shock reaches the internal components (e.g., actuator, read/write head, etc.) where the shock absorber does not unduly impact seek performance. Further, there is a need for a shock absorber that can reduce the effects of shock before the shock reaches the internal components without resulting in an increase in size of the computer system's chassis.

Physical Structure of an Apparatus for a Shock Absorber

The following discussion will begin with a description of the physical structures of shock absorbers, according to embodiments of the present invention. This discussion will then be followed with a description of the operation of a shock absorber, according to embodiments of the present invention. FIGS. 2A-2D depict shock absorbers, according to embodiments of the present invention. Each shock absorber 200 embodiment can include an assembly joint 201 and one or more flexures 202. The assembly joint 201 can be approximately the shape of a cube. The assembly joint 201 can be made of a material that provides cushioning. For example, the assembly joint 201 can be made of Original Equipment Manufacturer (OEM) pad or molded thermoplastic.

The assembly joint 201 can have a hole 204 in it. The hole 204 can be a threaded hole 204. Referring to the FIG. 2B embodiment, an assembly joint 201b can include an insert 214 that is surrounded by an assembly joint shroud 212. The insert 214 can provide the hole 204b. The insert 214 can be made of a strong material, such as metal.

Figures 2A, 2B, 2C, 2D:
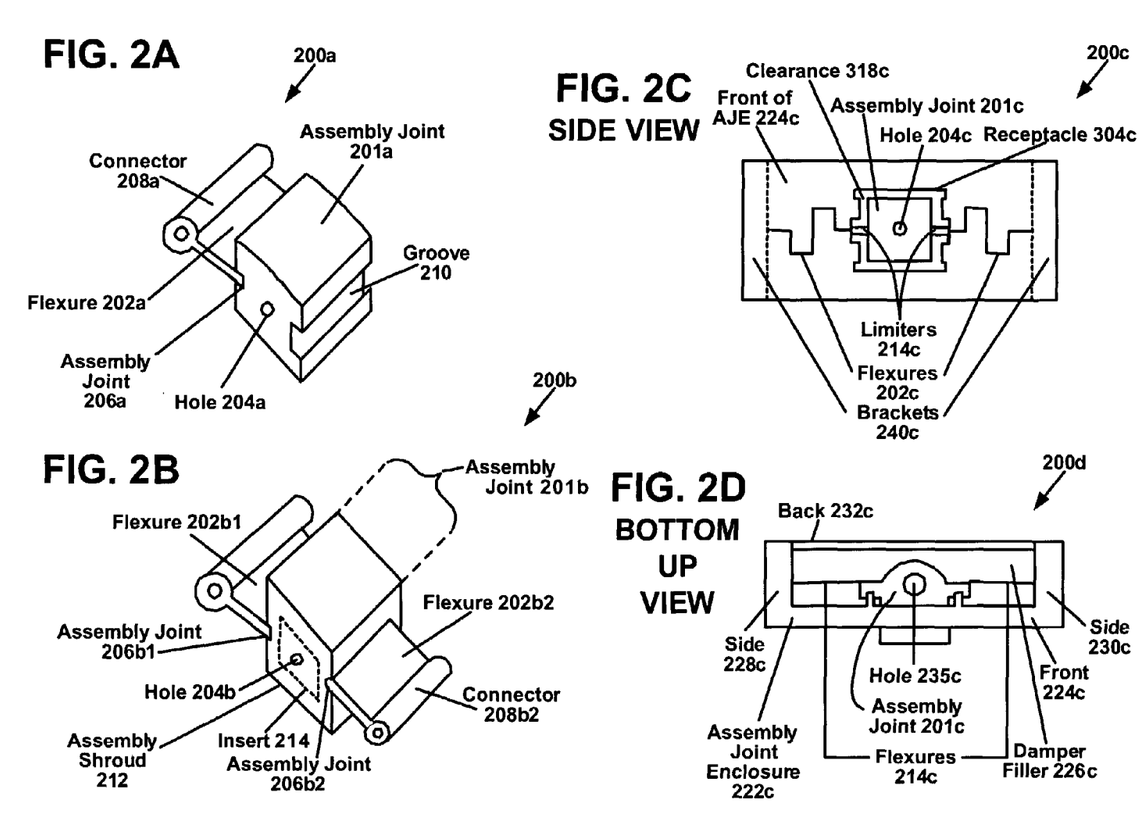
FIGS. 2A-2D depict shock absorbers, according to embodiments of the present invention.

Referring to the FIG. 2A embodiment, an assembly joint 201a can have a groove 210, for example, along one of its sides. Referring to the embodiments depicted in FIGS. 2A, 2B, an assembly joint 201a, 201b can have additional assembly joints 206a, 206b1, 206b2 for coupling flexures 202a, 202b1, 202b2 to an assembly joint 201a, 201b.

In the FIG. 2C embodiment, an assembly joint 201c can include limiters. The limiters 214c, for example, can be on the sides of the assembly joint 201c, that, for example, are lip shaped extensions of the assembly joint 201c.

Referring to embodiments depicted in FIGS. 2A, 2B, 2C, flexures 202 can be made out of steel, molded thermoplastic, or wire, among other things. According to a preferred embodiment, flexures 202 can be made of materials that do not change their properties over the range of temperatures that result from operating a disk drive and do not fatigue or age with time, according to embodiments of the present invention. For example, the flexures 202a, 202b1, 202b2 can be made of steel.

Referring to embodiments depicted in FIGS. 2A, 2B, the flexures 202a, 202b1, 202b2 can have a shape that approximates a blade, for example, where the flexures 202a, 202b1, 202b2 are long along an x-axis 112, thin along a z-axis 114, and of an intermediate length along a y-axis 116. The flexures 202 can have a connector 208, for example, at one end. The connector 208 can have a cylindrical shape.

Referring to the FIG. 2C embodiment, one end of the flexures 202c can be attached to the assembly joint 201c. For example, one end of the flexures 202c can be attached to the limiters 214c associated with the assembly joint 201c. The flexures 202c can have one or more associated bends. The flexures 202c can be bent, for example as depicted in FIG. 2C, at right degrees. Alternatively, the flexures 202c can be bent in curves such as curves with sinusoidal shapes. The shock absorber 200c can further include the front 224c of an assembly joint enclosure 222c (AJE) and brackets 240c.

The receptacle 304c for the assembly joint 201c can be large enough to provide clearance 318 between the assembly joint 201c of the shock absorber 200c and the enclosure 302c of the disk drive. The clearance 318c is substantially small, according to one embodiment. For example, the clearance 318c can be approximately 0.2 millimeters (mm). According to a preferred embodiment, the clearance 318c is 0.5 mm.

FIG. 2D is a bottom up view of the of the shock absorber 200c depicted in FIG. 2C. The assembly joint 201c can include a second hole 235c at the bottom of assembly joint 201c that can be used instead or in addition to hole 204c to couple the shock absorber 200c to the chassis of a computer system. The shock absorber 200c can further include an assembly joint enclosure 222c. The assembly joint enclosure 222c can be formed from two pieces, for example, where one piece has a front 224c and two sides 228c, 230c and the second piece forms the back 232c. The second piece can be a plate. The shock absorber 200c can further include damper filler 226c, as well as brackets 240c on the sides 228c, 230c. The damper filler 226c can be made of viscolastic material. The brackets 240c can form the sides 228c, 230c of the assembly joint enclosure 222c. The brackets 240c can be integral parts of the shock absorber 200c.

Figure 3A:
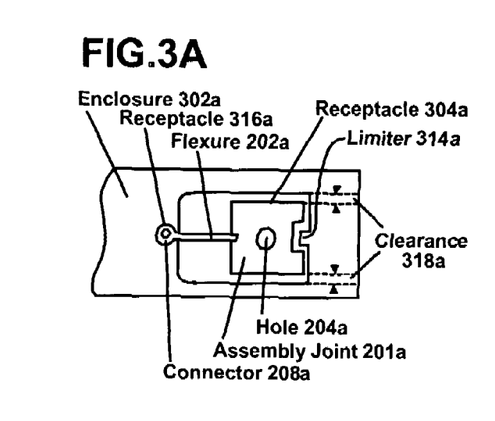
FIGS. 3A-3C and FIGS. 3D-3F depict shock absorbers coupled with enclosures of a disk drive, according to one embodiment.
Figure 3B:
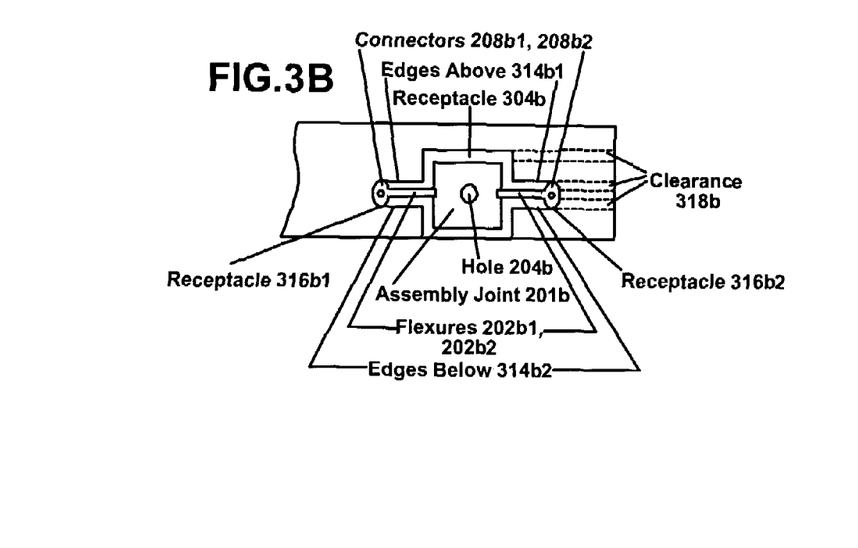
Figure 3C:
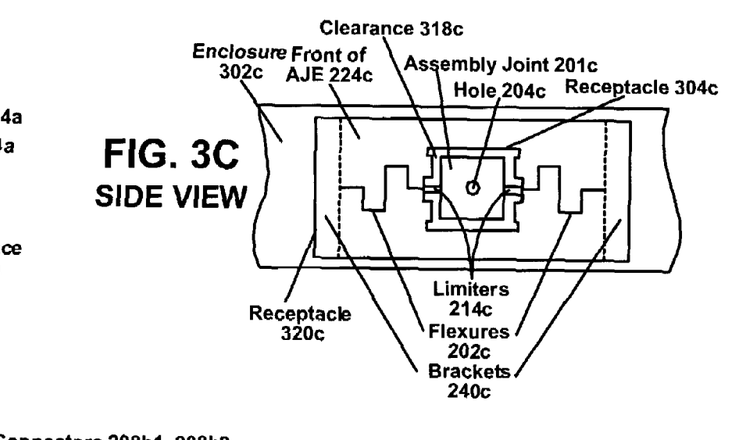

FIGS. 3A-3C depict shock absorbers coupled with enclosures of a disk drive, according to one embodiment. FIG. 3A depicts a shock absorber 200a with a single blade shaped flexure 202a coupled to an enclosure 302a, FIG. 3B depicts a shock absorber 200b with two blade shaped flexures 202b1, 202b2 coupled to an enclosure 302b, and FIG. 3C is a side view of a shock absorber 200c with two flexures 202c made of wire. The enclosure 302 of a disk drive can have a receptacle 304 for a shock absorber 200a, 200b, 200c. Further, in the case of shock absorbers 200a, 200b the enclosures 302 can have one or more receptacles 316a, 316b1, 316b2 for connectors 208 of the flexures 202.

Still referring to FIGS. 3A-3C, the enclosure 302 of the disk drive can be cast in a way that provides the receptacle 304a, 304b, 320c. For example, if the enclosure 302 is made of aluminum the enclosure 302 can be cast in a way that the receptacle 304a, 304b, 320c is a part of the enclosure 302. The receptacle 304a, 304b, 320c for the shock absorber 200 can be large enough to provide clearance 318 between the assembly joint 201 of the shock absorber 200 and the enclosure 302 of the disk drive. The clearance 318 is substantially small, according to one embodiment. For example, the clearance 318 can be approximately 0.2 millimeters (mm). According to a preferred embodiment, the clearance 318 is 0.5 mm. The receptacle 304 for the connector 208 can have a cylindrical shape.

Referring to the embodiments depicted in FIGS. 3A, 3B, the enclosures 302a, 302b can provide limiters. For example, in the FIG. 3A embodiment, the limiter 314a can be created from an extension of the enclosure 302a, according to one embodiment. For example, the enclosure 302a of the disk drive can be molded in such a way as to provide the limiter 314a. In the FIG. 3B embodiment, the edges of the enclosure above 314b1 and the edges of the enclosure below 314b2 the flexures 202b1, 202b2 can serve as limiters. A damping material (not shown) can be interposed between the limiters 314a, 314b1, 314b2 and an assembly joint 201a, 201b.

Figure 3D:
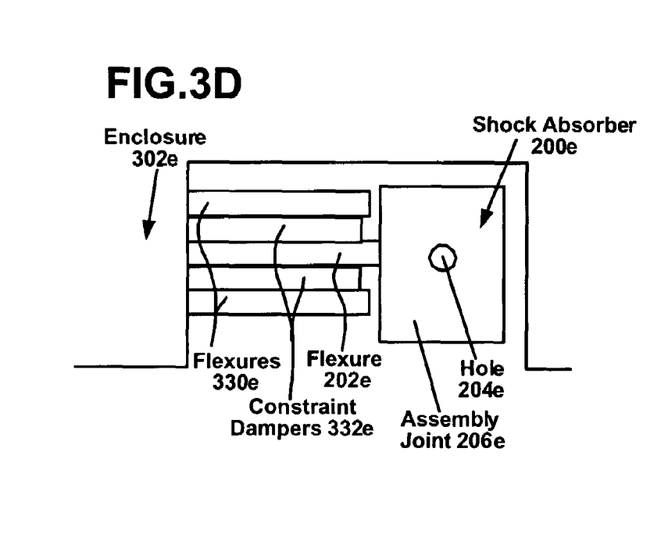
Figure 3E:
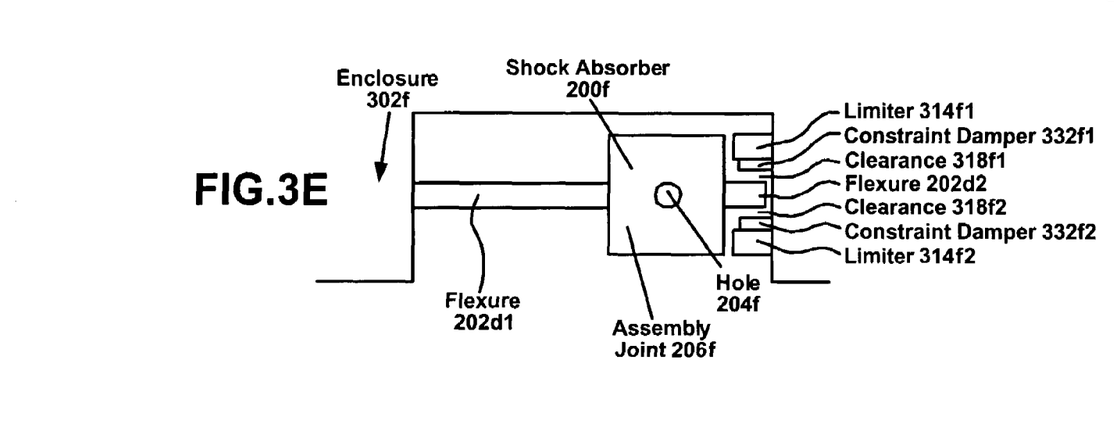
Figure 3F:
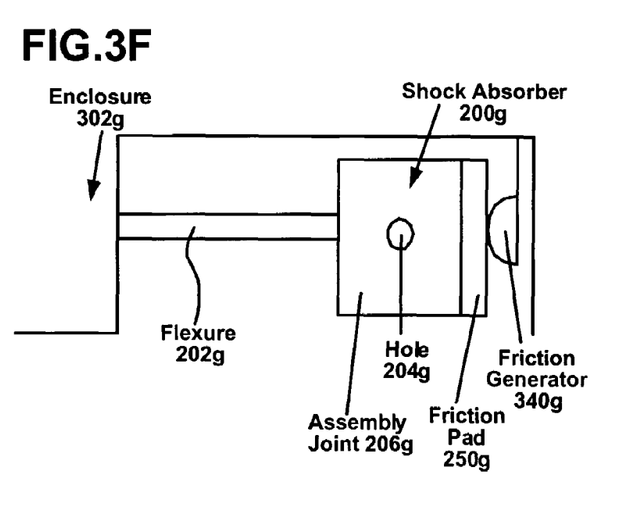

Referring to the embodiments depicted in FIGS. 3D-3F, the shock absorbers 200e, 200f, 200g can include assembly joints 206e, 206f, 206g, flexures 202e, 202d1, 202d2, 202g, and holes 204e, 204f, 204g. The assembly joints 2063, 206f, 206g can have an approximate shape of a cube. Referring to the FIG. 3F embodiment, the shock absorber can include a friction pad 250g.

Figure 4:
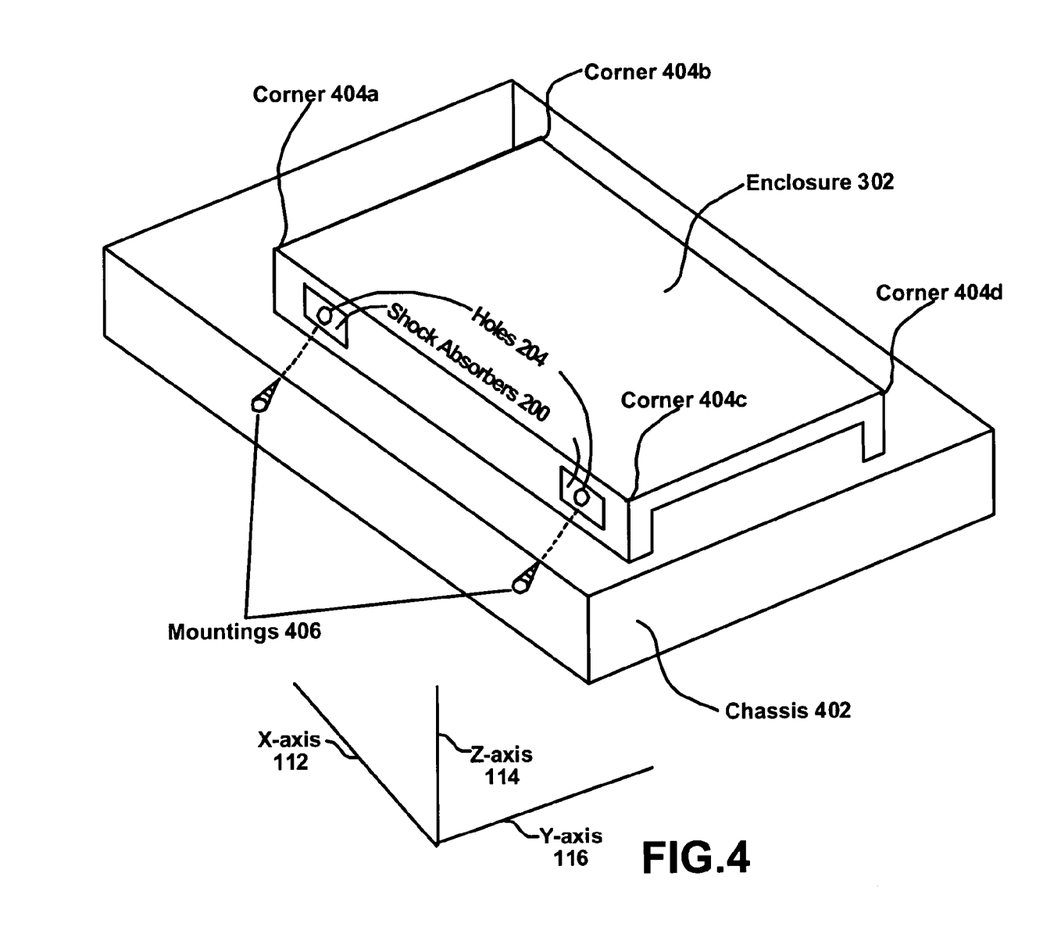
FIG. 4 depicts using shock absorbers to couple the enclosure of a disk drive to the chassis of a computer system, according to one embodiment.

FIG. 4 depicts using shock absorbers 200 to couple the enclosure 302 of a disk drive to the chassis 402 of a computer system, according to one embodiment. FIG. 4 depicts shock absorbers 200 at the four corners 404 of the enclosure 302 and mountings 406. The mountings 406 can use screws that are attached to the chassis 402, directly or indirectly, at one end, for example.

In operation, a shock absorber 200 can be assembled and used to couple the enclosure 302 of a disk drive to the chassis of a computer to allow the disk drive contained in the enclosure 302 to move with respect to the chassis of the computer.

An Apparatus for a Shock Absorber in Operation

The following discussion sets forth in detail the operation of a shock absorber, according to embodiments of the present invention. Referring to FIGS. 2A, 2B, a shock absorber 200a, 200b can be created by connecting one or more flexures 202 with the assembly joint 201 using additional assembly joints 206. For example, shock absorber 200a can be created by coupling flexure 202a to assembly joint 201a using assembly joint 206a and shock absorber 200b can be created by coupling flexures 202b1, 202b2 to assembly joint 201b using assembly joints 206b1, 206b2.

Referring to the FIGS. 2C, 2D embodiments, the assembly joint 201c can be partially enclosed in the assembly joint enclosure (AJE) 224c. For example, the assembly joint 201c can be inserted into the assembly joint enclosure 222c so that the back and parts of the sides 228c, 230c are enclosed in the assembly joint enclosure 222c. The assembly joint enclosure 222c can be completed with a plate to form the back 232c of the assembly joint enclosure 222c. Damper filler 226c can be used to fill the assembly joint enclosure 222c. The damper filler 226c can be used, at least in part, to reduce mild shocks, according to an embodiment. The flexures 202 can extend from the limiters 314 into the damper filler 226c.

Referring to embodiments depicted in FIGS. 3A, 3B, a shock absorber can be coupled to the enclosure of the disk drive, for example, by sliding the shock absorber into the receptacle associated with the enclosure of the disk drive. For example, a shock absorber 200 can be coupled to the enclosure 302 of the disk drive, for example, by sliding the shock absorber 200 into the receptacle 304 associated with the enclosure 302 of the disk drive, so that, the connectors 208 associated with the flexures 202 can be slide into receptacles 316 for the connectors 208. In the FIG. 3A embodiment, the limiter 314a associated with the disk drive enclosure 302a can be slide into the groove 210 associated with the assembly joint 201a of the shock absorber 200a. In the FIG. 3B embodiment, the flexures 202b1, 202b2 can be slide between the edges 314b1, 314b2 of the enclosure 302b that form the limiters, as already discussed herein, and the assembly joint 201b can be slide into receptacle 304b. In the FIG. 3C embodiment, the shock absorber 200c can be inserted (or "pressed") into a receptacle 320c associated with the enclosure 302c of a disk drive. The brackets 240c can be used for attaching the shock absorber 200c to the enclosure. For example, the brackets 240c can be used to couple the shock absorber 200c to the sides of the receptacle 320c.

Referring to the embodiments depicted in FIGS. 3A-3C, a clearance 318 is provided around an assembly joint 201 of the shock absorber 200 and a receptacle 304 to allow the shock absorber 200 to move with respect to the enclosure 302 of the disk drive. This clearance 318 can be above and/or below the assembly joint 201. In the FIG. 3A embodiment, the clearance 318a can also be between the limiter 314a associated with the enclosure 302a and the groove 210 associated with the assembly joint 201a. In the FIG. 3B embodiment, the clearance 318b can be around the flexures 202b1, 202b2 and the edges 314b1, 314b2 of the enclosure 302b that form the limiters.

Referring to the embodiments depicted in FIGS. 3D-3F flexures 202e, 202d1, 202d2, 202g can be coupled to the respective assembly joints 206e, 206f, 206g. Flexures 202e, 202d1, 202g can also be coupled with the enclosures 302e, 302f. The assembly joints 206e, 206f, 206g can be coupled to a chassis 402 using holes 204e, 204f, 204g in a manner already described herein.

The FIG. 3D embodiment, includes additional flexures 330e that can be coupled at one end to the enclosure 302e. Constraint dampers 332e can be between the flexure 202e and flexures 330e to provide continuous damping of shocks, according to one embodiment. The constraint dampers 332e can be made of viscoelastic material, for example.

The FIG. 3E embodiment, includes two flexures 202d1, 202d2 where one of the flexures 202d1 is relatively longer than the second flexure 202d2. Two limiters 314f1, 314f2 can be coupled to the enclosure 302f at one end. The limiters 314f1, 314f2 can include dampers 332f1, 332f2. Dampers 332f1, 332f2 can be made of a viscoelastic material, for example. The FIG. 3E embodiment provides a clearance 318f1, 318f2 between the shorter flexure 202d2 and the dampers 332f1, 332f2. The clearance 318f1, 318f2 can be approximately 0.2 mm, according to one embodiment. Since, for example, the FIG. 3E embodiment provides clearances 318f1, 318f2 between the flexure 202d2 and the dampers 332f1, 332f2 associated with limiters 314f1, 314f2, there can be a non-linear relationship between the force exerted, for example, by a shock and the deflection provided by the dampers 332f1, 332f2. In the case of clearances 318f1, 318f2 that are approximately 0.2 mm, the flexure 202d2 can still move for approximately 0.5 mm, for example, in either direction. The flexure 202d2 can move approximately 0.2 mm before being constrained by the dampers 318f1, 318f2, however, even after the flexure 202d2 comes into contact with the dampers 318f1, 318f2, the flexure 202d2 can continue to move up to approximately 0.5 mm in either direction, for example.

In yet another embodiment, the dampers 332f1, 332f2 can have a tetrahedral shape with, for example, the broad end of the dampers 332f1, 332f2 coupled to the limiters 314f1, 314f2 and the narrow end of the dampers 332f1, 332f2 facing the flexure 202d2. Further, the dampers 332f1, 332f2 can be in contact with the flexure 202d2, thus, eliminating the clearance 318f1, 318f2 between the dampers 332f1, 332f2, to provide smooth nonlinear damping of the force exerted by a shock.

Referring to the embodiment depicted in FIG. 3F, assembly joint 206g can include a friction pad 250g. The friction pad 250g can be a rough surface. The friction pad 250g can be made of the same material as the assembly joint 206g or another type of material. A friction generator 240g can be attached at one end to the enclosure 302g. As the assembly joint 206g moves up and down along the z-axis, the friction generator 340g can provide force against the friction pad 250g to dampen the movement of the assembly joint 206g along the z-axis, according to one embodiment.

Referring to FIG. 4 and the embodiments depicted in FIGS. 3A-3C, shock absorbers 200 can be associated with an enclosure 302 of the disk drive, for example, at the four corners 404 of the enclosure 302, according to embodiments already described herein. The shock absorbers 200 can be coupled with the chassis 402 using mountings 406. For example as already mentioned, the mountings 406 can use screws. These screws can be screwed into the holes 204 associated with the shock absorbers 201, thus, coupling the enclosure 302 of the disk drive to the chassis 402 of the computer system.

As can be seen from FIGS. 2A-2D and 3A-3C, a shock absorber 200 can have a form that can be used to flexibly couple the enclosure 302 of a disk drive with the chassis 402 of a computer system. For example, since a shock absorber 200 can have one or more flexures 202 that allows the assembly joint 201 to move (e.g., to flex up and down along the z-axis 114) with respect to the enclosure 302 of the disk drive and since the shock absorber 200 can be used to couple the enclosure 302 of the disk drive with the chassis 402 of the computer system, a shock absorber 200 can be used to flexibly couple the enclosure 302 with the chassis 402, thus, allowing the enclosure 302 of the disk drive to move with respect to the chassis 402 of the computer. The clearance 318 that is between the assembly joint 201 and a respective receptacle 304 to allow the assembly joint 201 to move within the space provided by the clearance 318. For example, with a clearance of 0.5 mm, an assembly joint 201 can move up and down by 0.5 mm. According to one embodiment, the larger the clearance is the greater the relative displacement (e.g., shock) that can be handled by the shock absorber 200.

Limiters 214c, 314c, 314b1, 314b2 restrict the movement of the assembly joint 201 to protect the flexures 202 from being overstrained, according to an embodiment. For example, limiters 214c, 314c, 314b1, 314b2 restrict how far an assembly joint 201 can move in the direction of the z-axis 114, thus, preventing the flexures 202, which are attached to an assembly joint 201, from being overstrained.

A damping material (not shown) can be interposed between a limiter 314 and the assembly joint 201, in the case of the single flexure embodiment depicted in FIGS. 2A, 3A, or between the limiters formed by the edges 314b1, 314b2 of an enclosure 302b and the flexures 202b1, 202b2, in the case of the dual flexure embodiment depicted in FIGS. 2B, 3B, to reduce vibrations that result from the movement of the assembly joint 201, according to another embodiment. Further, the damping material can be used to prevent the hard surfaces from hitting each other and creating secondary shocks.

Referring to the embodiments depicted in FIGS. 2A-2D and 3A-3C, a shock absorber 200 can be used to flexibly couple the enclosure 302 of the disk drive with the chassis 402 of the computer without requiring an increase in size of the chassis 402. For example, a shock absorber 200 can have a form (e.g., a shape) that allows the shock absorber 200 to fit inside of the receptacle 304 associated with the enclosure 302 of the disk drive in such a way that the dimensions of the enclosure 302 do not need to be increased, thus, not requiring an increase in the size of the chassis 402 of the computer. Further, since the shock absorber 200 can fit inside of the receptacle 304, the fact that shock absorbers 200 are used would be transparent to manufacturing personnel from a mounting perspective (e.g., when coupling the disk drive's enclosure 302 to the computer system's chassis 402).

Figure 6:
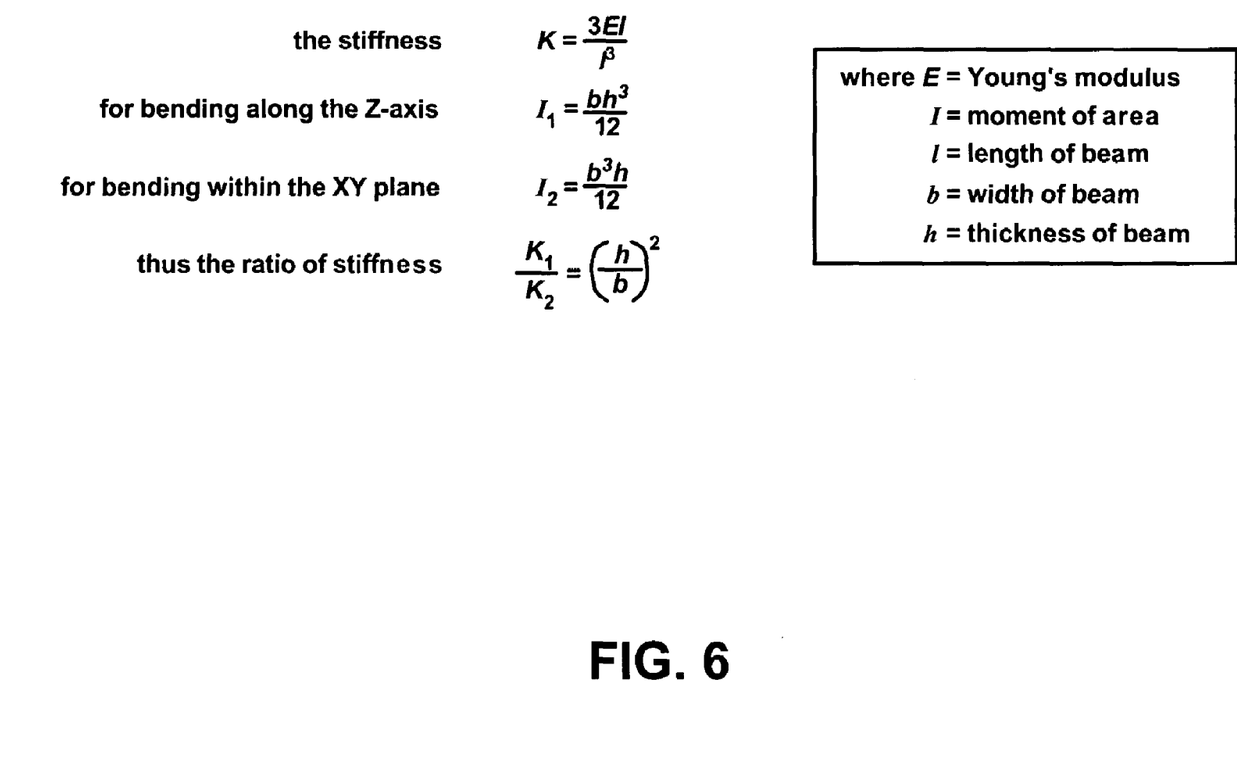
FIG. 6 depicts that quantify various aspects of a cantilever beam, according to embodiments of the present invention.

Since flexures 202a, 201b1, 201b2 depicted in FIGS. 2A, 2B, 3A, 3B have a blade shape (e.g., long along an x-axis 112, thin along a z-axis 114, and of an intermediate length along a y-axis 116) the enclosure 302 of the disk drive will move more easily along the z-axis 114 than along the x-axis 112 or the y-axis 116. For example, A cantilever beam has the shape of a blade, where one of the cross sections, such as the cross section along the z-axis 114, is slender. Further a cantilever beam is mounted on one end and can move at the other end. The flexures 202a, 202b1, 202b2 depicted respectively in the single flexured shock absorber 200a and dual flexured shock absorber 200b embodiments discussed above are cantilever beams, according to embodiments of the invention. Cantilever beams can bend more easily in the direction of its slender cross section but are more difficult to bend along its wider cross sections. For example, the flexures 202a, 202b1, 202b2 are more easy to bend along the z-axis 114 and more difficult to bend along the x-axis 112 and the y-axis 116 (e.g., xy plane). For example, the equations depicted in FIG. 6 quantify various aspects of a cantilever beam, according to embodiments of the present invention.

Further, by using cantilever beams as flexures 202a, 202b1, 202b2, the stiffness along the z-axis 114 is such that the resonant frequency of the disk drive enclosure 302 mounted with shock absorbers 200a, 200b that use cantilever beams as flexures 202a, 202b1, 202b2 is approximately 225 Hz. According to one embodiment, 225 Hz was chosen because the resonant frequencies of most internal components lie in the 400 Hz and higher range. For example at 225 Hz, the shock absorbers 200a, 200b can mitigate all shocks of higher frequency that could set the internal components of a disk drive into vibration while keeping the sway space (e.g., movement along the x-axis 112 and y-axis 116) to a minimum. The cantilever beam embodiments can mitigate shocks of 1000 g, with 0.1 milliseconds (ms) width in time, down to 45 G at 2.2 ms width in time. Tests have shown that these results can be achieved with a clearance of approximately 0.2 mm By using four such cantilever beams at the mounting points of a disk drive, embodiments of the present invention allow the disk drive to move more easily along the z-axis 114, thus, reducing the chances of the read/write head colliding with the platter, but less easily along the x-axis 112 and the y-axis 116, thus, not unduly impacting seek performance.

Referring to embodiments depicted in FIGS. 2C, 2D, 3C using wires to implement flexures 202 allows the assembly joint 201c to move in all directions (e.g., along the x-axis 112, the y-axis, and the z-axis 114). Flexures 202 implemented with wires results in less space being used for the flexures 202. The length of the wires that form the flexures 202, according to one embodiment, controls, at least in part, the amount the assembly joint 201c is allowed to move. For example, the longer the wires that form the flexures 202 are the more the assembly joint 201c can move.

Electrical and/or mechanical mechanisms can be used to correct motion along the x-axis 112 and/or the y-axis 116. For example, when the actuator moves as a result of locating a track of data (also common referred to as a "seek"), there is torque on the actuator. The effect of the torque causes vibrations (movement along the x-axis 112, y-axis 116, and z-axis 114) in the disk drive. There are solutions that provide electrical and/or mechanical corrections to reduce movement along the x-axis 112 and/or the y-axis 116 that result from the torque. For example, actuators can be built to provide electrical and/or mechanical corrections. According to one embodiment, using solutions to provide electrical and/or mechanical corrections, to reduce movement along the x-axis 112 and/or the y-axis 116, can be used in combination with a shock absorber 200c that uses wire flexures 202c to provide movement along the z-axis 114.

Figure 5:
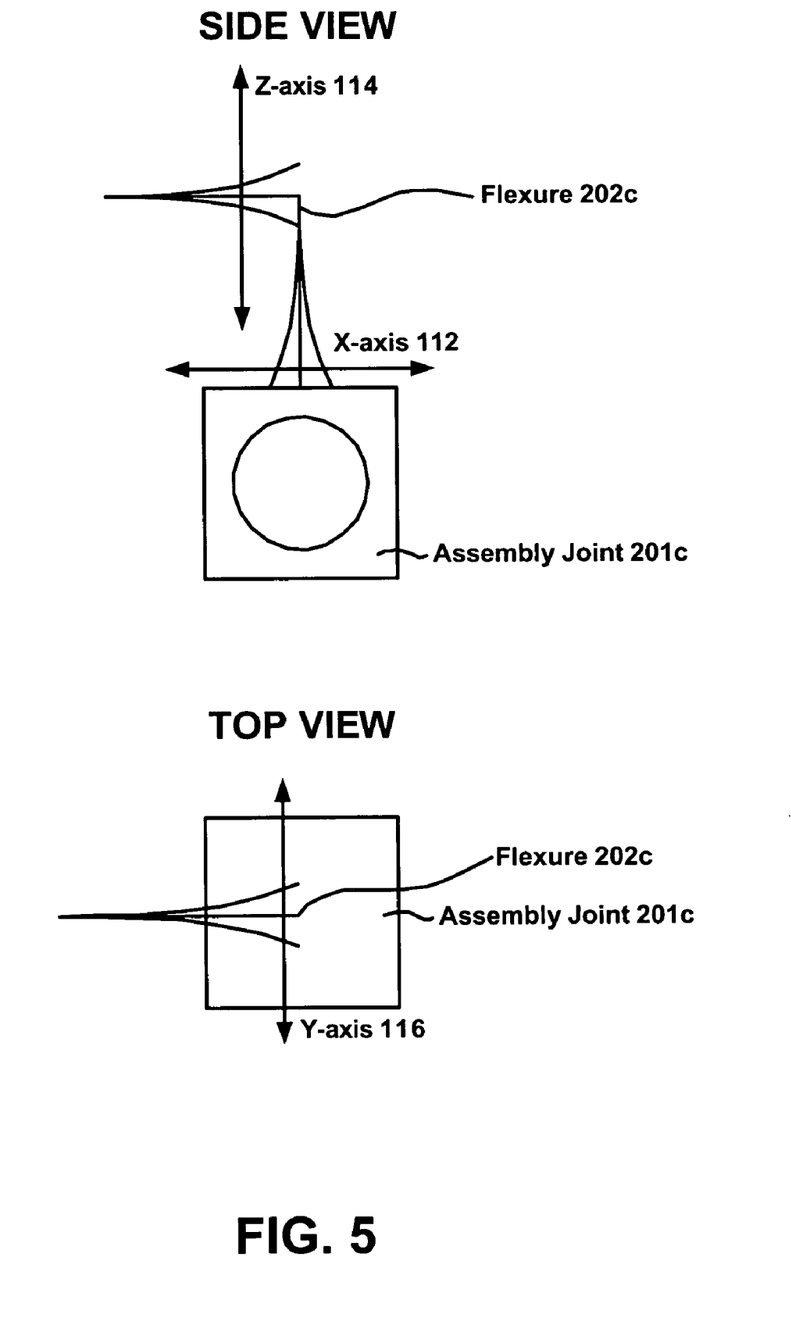
FIG. 5 depicts the movement of wired flexures along the x-axis, the y-axis, and the z-axis, according to embodiments of the present invention.

For example, referring to FIG. 5 wired flexures 202c allow movement along the x-axis 112, the y-axis 116, and the z-axis 114, according to embodiments, however, movement along the x-axis 112 and the y-axis 116 are not desirable because these movements impair seek performance, according to other embodiments as already discussed herein. The solutions that provide electrical and/or mechanical corrections can be used to provide at least adequate seek performance while the shock absorber 200c that uses wire flexures 202c results in a lower probability of the read/write head colliding with the platter. The damper filler 226c can be used, at least in part, to reduce mild shocks, according to an embodiment.

A METHOD OF MANUFACTURING A DISK DRIVE SHOCK ABSORBER

Figure 7:
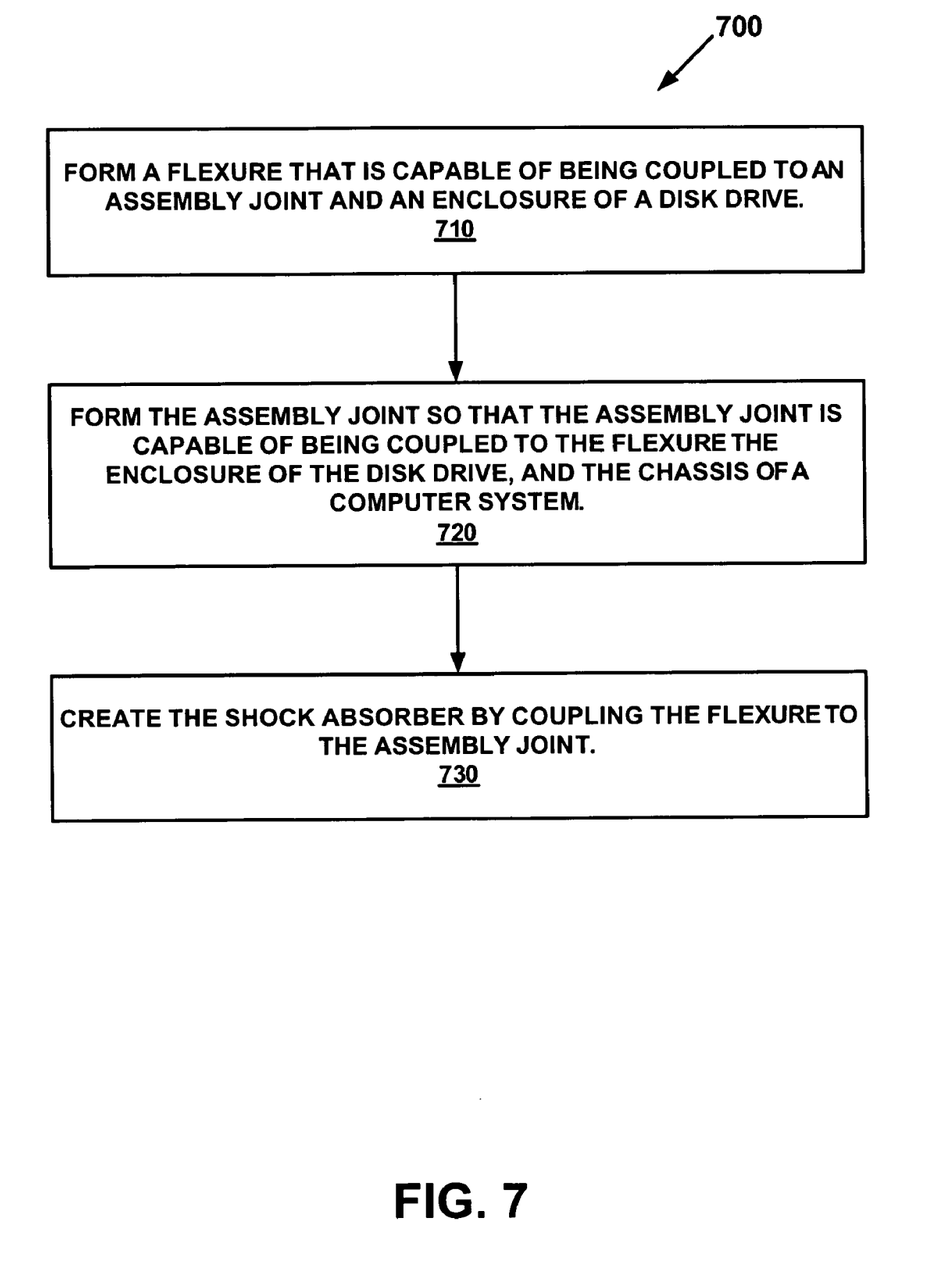
FIG. 7 is a flow chart for a method of manufacturing a disk drive shock absorber, according to embodiments of the present invention.

FIG. 7 is a flow chart for a method of manufacturing a disk drive shock absorber 200, according to embodiments of the present invention. Although specific steps are disclosed in flowchart 700, such steps are exemplary. That is, embodiments of the present invention are well suited to performing various other steps or variations of the steps recited in flowchart 700. It is appreciated that the steps in flowchart 700 may be performed in an order different than presented, and that not all of the steps in flowchart 700 may be performed. All of, or a portion of, the embodiments described by flowchart 700 can be implemented using computer-readable and computer-executable instructions which reside, for example, in computer-usable media of a computer system or like device. For the purposes of illustration, the discussion of flowchart 700 shall refer to the structures depicted in FIGS. 2A, 3A, and 4.

In step 710, a flexure 202a that is capable of being coupled to an assembly joint 201a and an enclosure 302a of a disk drive is formed, according to an embodiment. For example, a single flexure 202a can be made of steel. One end of the flexure 202a can be made so that it is capable of being coupled with an assembly joint 201a. The other end of the flexure 202a can be made with a cylindrical shape connector 208a, for example, that is capable of being coupled with an enclosure 302a of a disk drive.

In step 720, the assembly joint 201a is formed so that the assembly joint 201 is capable of being coupled to the flexure 202a, the enclosure 302a of the disk drive, and the chassis of the computer system, according to another embodiment. For example, an assembly joint 201a that has a shape approximately of a cube can be made of a material that provides cushioning, such as OEM pad. The cube shaped assembly joint 201a can be formed to have a second assembly joint 201a for coupling the flexure 202a to the cube shaped assembly joint 201a. The cube shaped assembly joint 201a can also have a groove 210a that fits around a limiter 314a associated with the enclosure 302a of the disk drive and a threaded hole 204a for coupling it with the chassis 402 of a computer system.

In step 730, the shock absorber 200a is created by coupling the flexure 202a to the assembly joint 201a, according to yet another embodiment. For example, the shock absorber 200a can be created by using the second assembly joint 201a to couple the flexure 202a to the cube shaped assembly joint 201a.

The shock absorber 200a has a form that can be used to flexibly couple the enclosure 302a of the disk drive with the chassis 402 of the computer system without requiring an increase in the size of the chassis 402 of the computer system. For example, the shock absorber 200a can be inserted into the receptacle 304a associated with the enclosure 302a of the disk drive so that the connector 208a of the flexure 202a is slid into receptacle 304a and the limiter 314a of the enclosure 302a is slid into the groove 210a of the shock absorber 200a's assembly joint 201a. Mountings, such as screws, associated with the chassis 402 of the computer system can be screwed into the hole 204a of the assembly joint 201a.

The flexure 202a associated with the shock absorber 200a allows the shock absorber 200a's assembly joint 201a to move with respect to the enclosure 302a, for example, by flexing up and down. Further, the shock absorber 200a can have a form that allows the shock absorber 200a to fit inside of the receptacle 304a associated with the enclosure 302a of the disk drive in such a way that the shock absorber 200 does not increase the dimensions of the enclosure 302a, thus, not requiring an increase in the size of the chassis 402 of the computer system to accommodate the disk drive.

CONCLUSION

Prior attempts at using shock absorbers 200 to allow disk drives to move with respect to a computer system's chassis 402 have resulted in teaching away from the use of shock absorbers 200 for this purpose because these prior attempts have resulted in increasing the size of the computer system's chassis 402. The increase in the size of the computer system's chassis is unacceptable for mobile computing systems. One reason these prior attempts resulted in increasing the size of the computer system's chassis is because they required clearances 318 that are significantly large in order to provide significant reductions in collisions between the read/write head and the platters of a disk drive. However, test results have shown that significant reductions in collisions can be obtained with substantially small clearances, such as a clearance that is approximately 0.2 mm, thus, resulting in a significantly reduction in the chances of losing important customer data.

What is claimed is:

1. A disk drive shock absorber that allows a disk drive to move with respect to a chassis of a computer system, the disk drive shock absorber comprising:
   an assembly joint configured to couple an enclosure of the disk drive with the chassis of the computer system;
   a flexure coupled to the assembly joint, the flexure providing flexible coupling of the assembly joint to the enclosure, wherein the flexure is more flexible along a z-axis that is perpendicular to an actuator associated with the disk drive than along an x-axis and a y-axis that are perpendicular to the z-axis; and
   the shock absorber having a form wherein the shock absorber can flexibly couple the enclosure of the disk drive with the chassis of the computer system without requiring an increase in size of the chassis.

2. The disk drive shock absorber of claim 1, wherein a receptacle is associated with the enclosure of the disk drive for receiving the shock absorber.

3. The disk drive shock absorber of claim 1, wherein the assembly joint has a shape that approximates a cube.

4. The disk drive shock absorber of claim 1, wherein the assembly joint is made of a material that provides cushioning.

5. The disk drive shock absorber of claim 1, wherein a hole is associated with the assembly joint and wherein the hole is used for coupling the chassis to the shock absorber.

6. The disk drive shock absorber of claim 1, wherein the shock absorber includes a limiter that restricts movement of the assembly joint to protect the flexure from being overstrained.

7. The disk drive shock absorber of claim 6, wherein the limiter is formed from an extension of the enclosure.

8. The disk drive shock absorber of claim 6, wherein the limiter is formed by edges of the enclosure that are above and below the flexure.

9. The disk drive shock absorber of claim 1, wherein a receptacle is large enough to provide clearance between inner walls of the receptacle and outer walls of the assembly joint.

10. The disk drive shock absorber of claim 9, wherein the clearance is substantially small.

11. The disk drive shock absorber of claim 10, wherein the clearance is approximately 0.2 millimeters (mm).

12. The disk drive shock absorber of claim 9, wherein the clearance is between the limiter and the assembly joint.

13. The disk drive shock absorber of claim 1, wherein the flexure has a shape that approximates a blade.

14. The disk drive shock absorber of claim 1, wherein the flexure is made of a material selected from a group of steel, molded thermoplastic, and wire.

15. The disk drive shock absorber of claim 1, wherein the shock absorber has two flexures.

16. The disk drive shock absorber of claim 1, wherein the assembly joint is at least partially enclosed in an assembly joint enclosure.

17. The disk drive shock absorber of claim 16, wherein the assembly joint enclosure is at least in part filled with damper filler.

18. The disk drive shock absorber of claim 1, wherein a mechanism selected from a group consisting of an electrical correction mechanism and a mechanical correction mechanism is used to correct vibrations along an axis selected from a group consisting of an x-axis and a y-axis.

* * * * *